April 7, 1953 — A. B. MAXAM — 2,634,168

MODEL AIRPLANE WHEEL

Filed May 27, 1948 — 2 SHEETS—SHEET 1

INVENTOR.
ALLEN B. MAXAM

BY
D. Gordon Angus
ATTORNEY

April 7, 1953 A. B. MAXAM 2,634,168
MODEL AIRPLANE WHEEL
Filed May 27, 1948 2 SHEETS—SHEET 2

INVENTOR.
ALLEN B. MAXAM
BY
D. Gordon Angus
ATTORNEY

Patented Apr. 7, 1953

2,634,168

UNITED STATES PATENT OFFICE 2,634,168

MODEL AIRPLANE WHEEL

Allen B. Maxam, Burbank, Calif.

Application May 27, 1948, Serial No. 29,523

3 Claims. (Cl. 301—122)

The invention relates to wheels of the type used for model airplanes and the like and has for its object to provide an effective, efficient and relatively simple construction for such a wheel.

It is desired that wheels for model aircraft shall be very light in weight and yet sturdy enough so that they will not come apart when the aircraft is taking off or landing. In accordance with my present invention, I provide a construction which fits these needs. I carry out my invention by the provision of the wheel axle within a bushing rotatable about the axle, the axle being locked in position within the bushing. The bushing is suitably fastened within the hub of the wheel so that it will not come off or come apart in action.

Features of my novel construction relate to the provision of the hub in two mating parts held together by the bushing. A related feature is the provision of a locking means set within a groove of the axle for locking the axle within the bushing.

Another feature which may be used is the provision of means in association in the hub for mounting a rubber or rubberlike tire on the hub.

Other features and modifications will be better understood from the following detailed description and the accompanying drawings of which:

Figure 1:
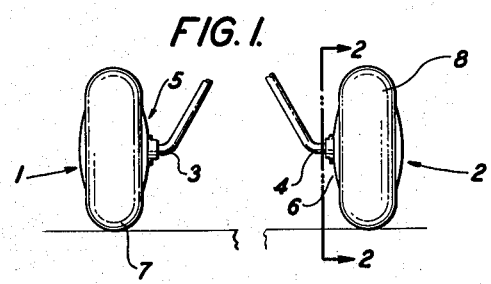
Fig. 1 illustrates two wheels of a model aircraft mounted in the relation to each other in which they are actually used.
Figure 2:
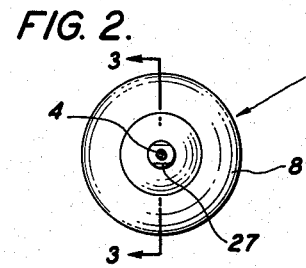
Fig. 2 is a side elevation of one of the wheels looking from line 2—2 of Fig. 1.
Figures 3, 4, 5, 6:
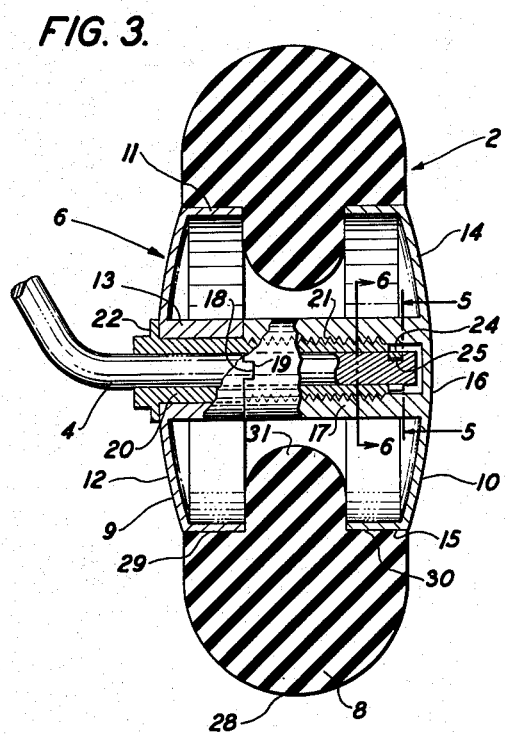
Fig. 3 is a cross-section of one of the wheels taken at line 3—3 of Fig. 2.
Fig. 4 is a cross-section view showing a construction which is modified from that of Fig. 3, this view likewise being taken at line 3—3 of Fig. 2.
Fig. 5 is a cross-section view showing a detail of the axle locking construction taken at line 5—5 of Fig. 3.
Fig. 6 is a cross-section view showing a detail taken at line 6—6 of Fig. 3.

Fig. 1 illustrates a rear view of the left and right wheels 1 and 2 of a model aircraft; and shows the axles 3 and 4, respectively, protruding from the hubs 5 and 6 of the wheels. Around the respective hubs are placed tires 7 and 8. Fig. 3 shows one of the wheels 2 in cross-section and illustrates the arrangement of the axle 4 and the hub 6, the hub being composed of two parts 9 and 10, which fit together. Part 9 comprises a cylindrical peripheral portion 11 with a convex end portion 12 extending from the inner edge of the peripheral portion to a hollow cylindrical inner portion 13.

Part 10 similarly comprises a cylindrical peripheral portion 15, with the convex end portion 16 extending from the outer edge of the peripheral portion to the hollow cylindrical inner portion 17. The inner cylindrical portions 13 and 17 are made with the same inside and outside diameters so that they abut each other, as shown. Cylindrical member 13 is provided with a number of protruding lugs 18, for example, two such lugs spaced 180° apart; and the other cylindrical portion 17 is provided with corresponding slots or recesses 19 into which the lugs fit to prevent relative rotation between the two members 9 and 10. The two hub members 9 and 10 are secured in this mated position by means of a bushing having external threads 21 which thread into corresponding internal threads of the cylindrical portion 17, the bushing being threaded into member 17 until the collar 22 of the bushing firmly abuts the convex portion 12 of member 9. To facilitate the threading, the head of the bushing is preferably flattened at 27 to receive a wrench.

The axle 4 fits through the bushing 20 with a nice fit so that relative rotation is permitted between the axle and the bushing. Provision is made for locking the axle in its position within the bushing; and for this purpose, the end of the axle protrudes beyond the end of the bushing and is locked in this position by means of a locking ring or oval 24 held within a groove 25 of the axle.

Fig. 5 is a cross-section view showing in detail how the locking arrangement is assembled. This may conveniently be done by slipping the axle through the bushing 20 before the bushing is assembled with the hub members 9 and 10. With the axle completely within the bushing, ring 24 of circular shape is slipped over the end of the axle to the groove 25 at which position the ring is flattened to the oval shape shown in Fig. 5. This oval shape results from the fact that the groove 25 does not pass completely around the axle but is only passed through one side of the axle; so that when the ring 24 is compressed, part of it lies within the groove, and the remainder passes around the periphery of the axle. After this axle and bushing assembly is thus completed, the bushing may then be threaded into the hub members 9 and 10 as described above after which the upper end of the axle may be suitably fastened to the fuselage of the model aircraft. In view of the fact that the oval 24 must thus be passed through the hub members 9 and 10, the largest diameter of the oval should not exceed the internal diameter of the hub threads.

Fig. 6 illustrates the use of a continuous ring 24a, which may be inserted in the groove in circular form and then flattened to the oval form shown in Fig. 6.

The dimensions and separations of the cylindrical peripheral portions 11 and 15 of the hub members is such that the tire 8 of the solid or sponge rubber type may readily be fastened in place. For this purpose, the tire is shaped with the usual rounded periphery 28 on which it rolls, and with two cylindrical portions 29 and 30 corresponding with the cylinders 11 and 15. Between the cylindrical portions 29 and 30 there is provided an inwardly protruding annular bulge 31 which fits snugly between the cylindrical members 11 and 15 to keep the tire from coming off the hub. The tire thus shaped may be assembled on the hub members when the hub members are fitted together by the bushing 20.

Fig. 4 shows a modified form of the hub assembly arrangement. In this embodiment, the two opposite hub members 32 and 33 are different from the hub members 9 and 10 of Fig. 3. Hub member 32 is in the shape of a convex member having centrally through it a hole large enough so that bushing 34 may pass through it. The other hub member 33 is provided with a convex portion 35 similar to hub member 32 and is provided with a cylindrical portion 36 which protrudes inwardly to abut member 32. The cylinder 36 is internally threaded to thread with the threads 37 of bushing 34, which thus screws into cylinder 36 until the collar 38 abuts hub member 32. The axle is locked within the bushing 34 by the groove 25 and flattened ring or oval 24, the same as in the embodiment in Fig. 3.

The tire 39 differs from that of Fig. 3 in that it is shown of the hollow type. It is fitted to the periphery of the convex hub members 42 and 45, by means of peripheral shoulders 40 and 41. A spacing ring 42 holds the inner portion of the tire spread its proper distance by fitting into annular grooves 43 and 44, formed in the tire. Preferably, a number of holes 45 are placed through the ring to make it lighter.

Figure 7:
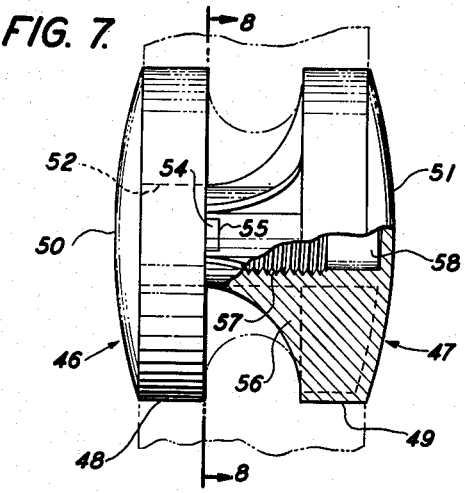
Fig. 7 is an end elevation view partially in cross-section, showing a modified form of hub assembly according to my invention.
Figure 8:
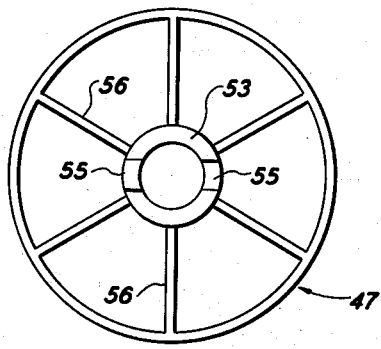
Fig. 8 is a side elevation taken at line 8—8 of Fig. 7.

Figs. 7 and 8 illustrate a modification of the hub assembly which may be especially useful for making hubs of plastic material in molds. The two hub members each have the outer peripheral cylindrical portions 48 and 49, respectively, and the convex portions 50 and 51 extending across the peripheries. Each of the hub members, furthermore, is provided with the inner cylindrical portions 52 and 53 through which the axle protrudes; and the member 52 has the lugs 54 and the member 53 has the corresponding slots 55. The length of cylindrical portion 52 is substantially shorter than the length of cylindrical member 53, in consequence of which member 52 needs no reinforcement. Member 53, however, is provided with a number of reinforcing vanes 56. The cylindrical member 53 is provided with inner thread 57 to receive the bushing and axle assembly as described in the preceding embodiment and the compartment 58 is provided to allow room for the locking ring assembly. The tire may be fitted to this embodiment in the same way as in the embodiment of Fig. 3.

Figure 9:
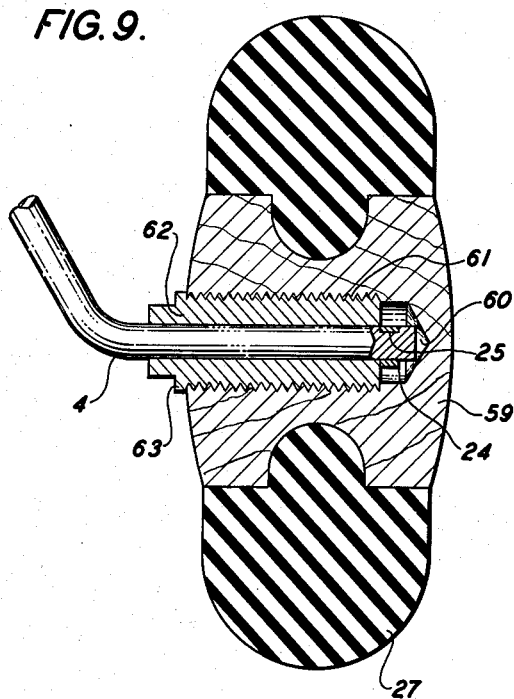
Fig. 9 is a cross-section view of another modification of a hub assembly according to my invention.

Fig. 9 shows a further modification which is especially adapted for use with a hub made of wood. In this embodiment, the hub 59 is a unitary solid construction provided with a central bore terminating with the recess 60 and the bore is internally threaded at 61 to receive the threads of bushing 62 which is threaded into it up to the collar 63. The axle is held through the bushing in the same manner as in the preceding embodiments by means of the groove 25 and flattened ring 24. The tire 27 may be similar to the same numbered tire in Fig. 3.

Figure 10:
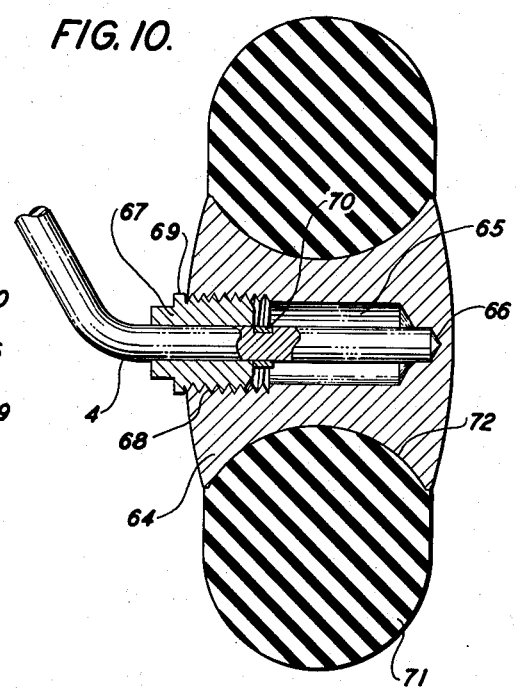
Fig. 10 is a cross-section view showing still another modification of hub assembly according to my invention.

Fig. 10 shows a further modification in which the hub member 64 is also of a solid unitary construction provided with the central bore 65 to receive the axle assembly. There is provided an additional bore 66 extending a short distance onwardly from the end of bore 65 and large enough in diameter to receive the end of axle 4. The inner end of axle 4 is rotatable within bushing 67 which is threaded by threads 68 within hub 64 until the collar 69 abuts the exterior of the hub. A suitable locking member 70 is provided to lock the axle within the bushing 67; and this locking arrangement may be the same groove and flattened ring arrangement as in the preceding embodiments. The tire 71 may have its internal periphery shaped to fit the concave surface 72 of the hub.

It will be recognized that by my invention, I have provided a simple and efficient assembly for a model aircraft wheel which is sturdy in construction and light in weight. Furthermore, the arrangement of the bushing and axle locking arrangement within the hub is applicable to various kinds of material such as lightweight metal, plastics, wood, or other suitable materials. My invention is not to be construed as limited to the particular embodiments illustrated in the drawings and described in the description, which are given by way of illustration rather than of limitation, and the invention is not limited except in accordance with the scope of the appended claims.

I claim:

1. A wheel assembly for model airplanes comprising a hub, a bore axially through the hub extending from one side thereof but not to the other side, an additional bore of smaller diameter than the first-mentioned bore extending axially beyond the first-mentioned bore, a bushing threaded into the first-mentioned bore from the open end thereof, and leaving a space between the inner end of the bushing and the inner end of the first-mentioned bore, an axle through the bushing and having its end inserted within the second bore, the end of the second bore acting as a stop for the end of the axle, and a locking means attached to the axle for preventing withdrawal of the axle through the bushing, said locking means comprising a groove at a side of the axle and a continuous oval member around the axle and passing through the groove.

2. A wheel assembly for model airplanes comprising a hub, a bore axially through the hub extending from one side but not to the other side of the hub, an additional bore of smaller diameter than the first-mentioned bore extending axially beyond the first mentioned bore, a bushing threaded into the first-mentioned bore from the open end thereof, and leaving a space between the inner end of the bushing and the inner end of the first-mentioned bore, an axle through the bushing having its end inserted into the second bore, the end of said second bore being a stop for the end of the axle, and a locking means comprising a non-resilient oval extending substantially around the axle and fastened to the axle within said space, for preventing withdrawal of the axle through the bushing.

3. A wheel assembly according to claim 2 in which the axle is provided with a groove at only one side thereof and the oval passes through the groove.

ALLEN B. MAXAM.

REFERENCES CITED

The following references are of record in the file of this patent:

UNITED STATES PATENTS

| Number | Name | Date |
|---|---|---|
| 840,399 | Taylor | Jan. 1, 1907 |
| 904,112 | Bastel | Nov. 17, 1908 |
| 1,911,447 | Heuer | May 30, 1933 |
| 2,456,355 | Aber | Dec. 14, 1948 |
| 2,540,034 | Maxam | Jan. 30, 1951 |